United States Patent
Hall

[19]

[11] Patent Number: 6,134,015
[45] Date of Patent: Oct. 17, 2000

[54] NORMALIZATION METHOD FOR FIBER OPTIC SENSOR SYSTEM

[75] Inventor: David B. Hall, La Crescenta, Calif.

[73] Assignee: Litton Systems, Inc., Woodland Hills, Calif.

[21] Appl. No.: 09/309,143

[22] Filed: May 10, 1999

[51] Int. Cl.[7] .................................................. G01B 9/02
[52] U.S. Cl. ..................................... 356/478; 250/227.27
[58] Field of Search ................................... 356/345, 351; 250/227.19, 227.27; 385/12, 14

[56] References Cited

U.S. PATENT DOCUMENTS

| | | | |
|---|---|---|---|
| 5,173,743 | 12/1992 | Kim | 356/345 |
| 5,227,857 | 7/1993 | Kersey | 356/345 |

*Primary Examiner*—Samuel A. Turner
*Attorney, Agent, or Firm*—Lynn & Lynn

[57] ABSTRACT

Quadrature signals Q and in-phase signals I output from a pathlength mismatched interferometric sensor are normalized sampling the signals to obtain a first set of values $Q_k = Q_0 B_k \sin \phi_k$ corresponding to the sine of the phase shift and a second set of values $I_k = I_0 B_k \cos \phi_k$ corresponding to the cosine of the phase shift where k is a running index of the set of consecutive samples of Q and I. A quantity $DQ_k = |(Q_{u(k)})^2 - (Q_{s(k)})^2|$ is calculated for the quadrature signals; and a quantity $DI_k = |(I_{u(k)})^2 - (I_{s(k)})^2|$ is calculated for the in-phase signals, where u(k) and s(k) are parameters used to determine indices that select specific sampled signals and k is a running index of the set of consecutive samples of Q and I. The normalization factor is then calculated as the ratio $R = Q_N / I_N$ where $$Q_N = \sqrt{\sum_{k=N_1}^{N_2} DQ_k} \text{ and } I_N = \sqrt{\sum_{k=N_1}^{N_2} DI_k}.$$

4 Claims, 2 Drawing Sheets

NORMALIZATION METHOD FOR FIBER OPTIC SENSOR SYSTEM

BACKGROUND OF THE INVENTION

This invention relates generally to signal processing techniques for fiber optic sensor systems. This invention relates particularly to processing signals indicative of a phase shift in an optical signal in both frequency-division-multiplexed (FDM) and time-division-multiplexed (TDM) sensor systems. Still more particularly, this invention relates to processing signals proportional to the sine and cosine of the phase shift in an optical sensor system to determine the magnitude of the phase shift.

Fiber optic sensor systems of both the FDM and TDM varieties acquire in the demodulation process one term proportional to the sine of the sensor phase shift and another term proportional to the cosine of the phase shift. The sine of the sensor phase shift is referred to as the quadrature term, Q; and the cosine of the sensor phase shift is referred to as the in-phase term, I. The angle of the phase shift is determined by calculating ratio Q/I, which is the tangent of the sensor phase shift. The amplitudes of the sine and cosine terms must be set equal by a normalization procedure to ensure the successful implementation of an arctangent routine to find the sensor phase shift.

Previous normalization methods require observing the phase shift over at least one cycle of $2\pi$ radians to obtain peak values of the sine and cosine terms. Preferably the phase shift is observed over many cycles. Unfortunately, there are considerable drawbacks to this requirement.

SUMMARY OF THE INVENTION

An improved normalization method is proposed that does not use peak detection. It can be used to update the normalization ratio for each sensor channel on an ongoing basis. The acoustic environment can be relatively quiet. Acoustic tones with peak-to-peak amplitudes of about 0.5 radian are sufficient. In the absence of these tones phase spinning at a few hertz due to static pressure or temperature variations is also sufficient.

A method for processing signals output from a pathlength mismatched interferometric sensor array that produces phase shifts in sensors included in the array to indicate changes in a parameter being monitored, comprises the steps of sampling the signal output from each sensor in the array to obtain for each sensor a first set of signal terms $Q_k = Q_0 B_k \sin \phi_k$ corresponding to the sine of the phase shift and a second set of signal terms $I_k = I_0 B_k \cos \phi_k$ corresponding to the cosine of the phase shift. For each sensor in the array the method includes the step of calculating a first quantity $DQ_k = |(Q_{u(k)})^2 - (Q_{s(k)})^2|$ and a second quantity $DI_k = |(I_{u(k)})^2 - (I_{s(k)})^2|$ where u(k) and s(k) are functions used to determine indices that select specific sampled signals and k is a running index of the set of consecutive samples of Q and I. The method further includes the steps of calculating a quantity $$Q_N = \sqrt{\sum_{k=N_1}^{N_2} DQ_k}$$

and calculating a quantity $$I_N = \sqrt{\sum_{k=N_1}^{N_2} DI_k}.$$

The normalization factor is then determined by the step of calculating the ratio $R = Q_N / I_N$.

The method according to the present invention preferably further includes the step of modulating the phase of optical signals input to at least one of the sensors in the array to normalize the signal terms $Q_N$ and $I_N$ so that the ratio $R = Q_N / I_N$ is unity for the selected sensor.

An appreciation of the objectives of the present invention and a more complete understanding of its structure and method of operation may be had by studying the following description of the preferred embodiment and by referring to the accompanying drawings.

DETAILED DESCRIPTION OF THE INVENTION

Figure 1:
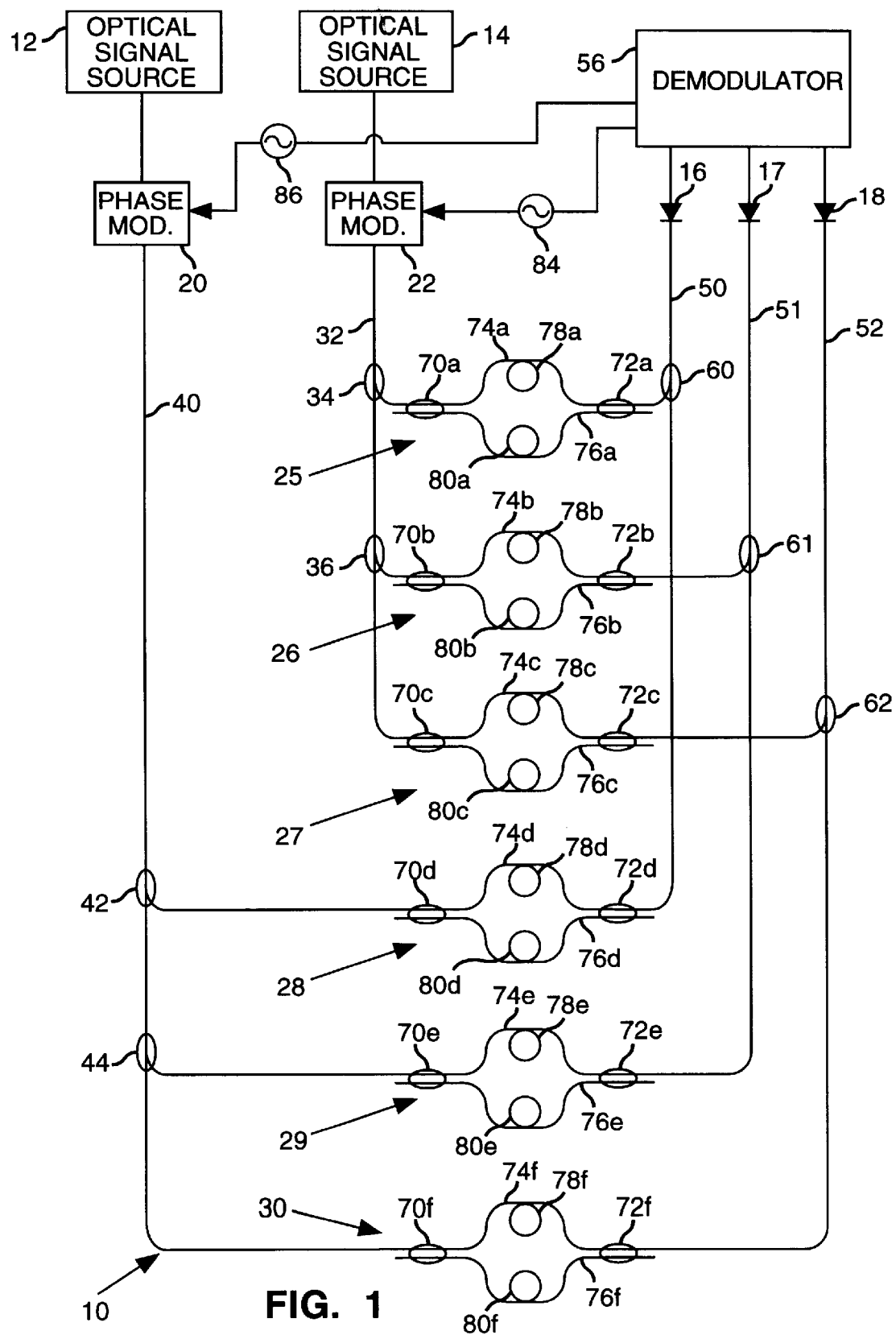
FIG. 1 illustrates an embodiment of a fiber optic sensor array with which the normalization method according to the present invention may be used.

FIG. 1 illustrates an exemplary sensor array architecture with which the signal processing method of the present invention may be used. The invention is not limited to use with this architecture. The invention may be used with any sensor system that provides two output signals that are in quadrature.

FIG. 1 illustrates an FDM architecture 10 that includes a pair of lasers 12 and 14 and three polarization diversity detectors 16–18. The lasers 12 and 14 have corresponding phase modulators 20 and 22. The phase modulators 20 and 22 have phase generated carrier frequencies $f_1$ and $f_2$.

The array 10 includes a plurality of Mach-Zehnder interferometer sensors 25–30. The Mach-Zehnder interferometer sensors 25–30 comprise an example of a sensor array with which the present invention can be used. The Mach-Zehnder interferometers 25–27 receive optical signals from the laser 14 via an optical fiber 32. Optical couplers 34 and 36 couple the optical signals from the optical fiber 32 to the Mach-Zehnder interferometers 25 and 26. The Mach-Zehnder interferometer sensors 28–30 receive optical signals from the laser 12 via an optical fiber 40. Optical couplers 42 and 44 couple the optical signals from the optical fiber 40 into the Mach-Zehnder interferometer sensors 28 and 29.

The Mach-Zehnder interferometer sensors 28–30 provide output signals to optical fibers 50–52, respectively. The optical fibers 50–52 are arranged to provide optical signals to the detectors 16–18, respectively. The detectors 16–18 are connected to a demodulator 56. The Mach-Zehnder interferometer sensors 25–27 provide output signals to optical couplers 60–62, respectively. The optical couplers 60–62 couple the output signals from the Mach-Zehnder interferometer sensors 25–27 into the optical fibers 50–52, respectively, so that these output signals are also input to the detectors 16–18, respectively.

The Mach-Zehnder interferometer sensors 25–30 may be substantially identical. Therefore, only the Mach-Zehnder interferometer sensor 25 is described in detail. The reference numerals for components of the Mach-Zehnder interferometer sensor 25 end with the letter "a." The remaining Mach-Zehnder interferometer sensors 26–30 have reference numerals that end with the letters b–f, respectively.

The Mach-Zehnder interferometer sensor 25 includes a pair of optical couplers 70a and 72a each arranged to couple light between a pair of optical fibers 74a and 76a. The optical fibers 74a and 76a include portions wound around corresponding mandrels 78a and 80a, respectively. The coupler 34 couples light from the optical fiber 32 into the optical fiber 74a. The coupler 70a divides the light between the optical fibers 74a and 76a. The coupler 72a combines the light that has propagated in the optical fibers 74a and 76a. The combined light beams are then input to the fiber 50 via the coupler 60. The combined light beams produce an interference pattern that indicates the phase difference between light guided by the optical fibers 74a and 76a between the two couplers 70a and 72a. The phase difference can be used to monitor acoustic pressure, for example, where each sensor is located.

The demodulator 56 receives electrical signals from the photodetectors 16–18 and then produces electrical signals that indicate the two terms Q and I that are processed to determine the phase shift for each of the sensors 25–30.

There are several techniques for obtaining electrical signals that indicate the terms Q and I that are used to determine the phase shift for each sensor in a fiber optic sensor array. One suitable technique involves sinusoidally modulating or dithering the optical signal output by the optical signal source. The terms Q and I may then be determined by synchronous detection of an odd harmonic and an even harmonic of the modulation or dither frequency. Modulation of the optical signal may be accomplished by modulating the current drive to a semiconductor laser. Another technique involves external phase modulation of the laser output. External phase modulation is preferred when low noise is a significant consideration. In a mismatched path fiber interferometer, the optical frequency modulation of the source light becomes a "phase-generated carrier" modulation that the optical receiver converts into an electrical signal.

A pair of voltage sources 84 and 86 are connected to the phase modulators 22 and 20, respectively. Voltage sources 84 and 86 are connected to demodulator 56 via corresponding feedback loops. Using the feedback, the voltage applied to the phase modulator 22 by the voltage source 84 is adjusted using the algorithm described below and illustrated in the flow chart of FIG. 2 to control the modulation depth of the phase modulator 22 such that the ratio Q/I is 1.0 for one selected sensor, for example, the sensor 25. The voltage applied to the phase modulator 20 by the voltage source 86 is similarly adjusted to control the modulation depth of the phase modulator 20 such that the ratio Q/I is 1.0 for another selected sensor, for example, the sensor 28. If the other sensors 26, 27, 29 and 30 are similar to the sensors 25 and 28, then adjusting the phase modulator voltages to normalize the signal terms Q and I for the sensors 25 and 28 will ordinarily cause the signal terms Q and I from all sensors in the array to be approximately normalized. The signal terms Q and I for the remaining sensors in the array are then completely normalized using the algorithm illustrated in the flow chart of FIG. 2.

The quadrature and in phase terms for signal processing are considered as discrete samples in the digital domain. The quadrature and in-phase terms for two samples designated 1 and 2 are given by $$Q_1 = Q_0 B_1 \sin\phi_1; \tag{1}$$

$$I_1 = I_0 B_1 \cos\phi_1; \tag{2}$$

$$Q_2 = Q_0 B_2 \sin\phi_2; \tag{3}$$

and $$I_2 = I_0 B_2 \cos\phi_2. \tag{4}$$

In Eqs. 1–4, the phase shift to be measured is $\phi$, and the signal amplitudes that change over time due to polarization fading are $Q_0 B$ and $I_0 B$. The coefficients $Q_0$ and $I_0$ are multiplicative constants whose ratio is needed for signal normalization. Over longer times the ratio of $Q_0/I_0$ varies slowly due to changes in the path mismatch of the interferometer sensor.

The fading term B can be considered a constant during a sufficiently short time span between samples 1 and 2. In this limit Eqs. 1–4 can be solved to obtain the ratio $R = Q_0/I_0$, which may be written as $$R = \frac{Q_0}{I_0} = \sqrt{\frac{|Q_1^2 - Q_2^2|}{|I_1^2 - I_2^2|}} \tag{5}$$

In addition to the assumption of stationary B, there is the assumption of some movement in $\phi$ to obtain the ratio R.

Figure 2:
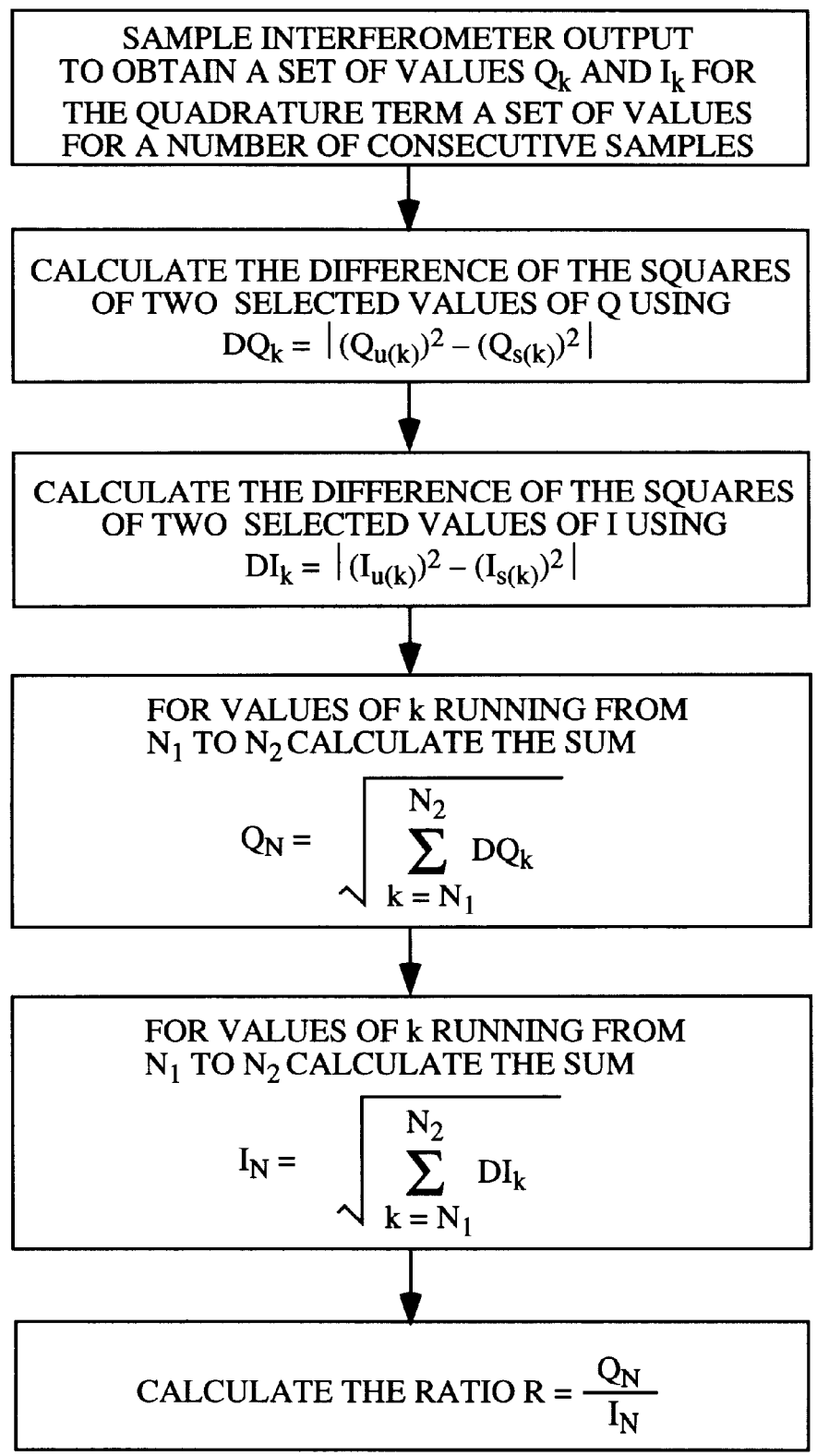
FIG. 2 is a flow chart of the normalization method according to the invention.

FIG. 2 illustrates a more general algorithm that is described below. First, a quantity $DQ_k$ is defined as:

$$DQ_k = |(Q_{u(k)})^2 - (Q_{s(k)})^2|; \text{ and} \tag{6}$$

a quantity $DI_k$ is defined as:

$$DI_k = |(I_{u(k)})^2 - (I_{s(k)})^2|. \tag{7}$$

The index k is a running index of the set of consecutive samples of Q and I. Expressions u(k) and s(k) are used to determine indices that select specific sampled signals. Any Q and I in the sampled data may be used to determine the difference terms $DQ_k$ and $DI_k$. Some examples of u(k) and s(k) with the constraints $N_1 \leq k \leq N_2$ and $N_1 \geq 0$ where $N_1$ and $N_2$ are integers used to label the sampled data are listed below.

(a) $u(k) = (k+s)^2$ and $s(k) = k^2$,
with s being an integer constant.
(b) $u(k) = 2^k + (-1)^k$ and $s(k) = N_1$.
(c) $u(k) = u \cdot k + t$ and $s(k) = s \cdot k$,
with u, s and t being integer constants.
(d) $u(k) = s \cdot k + t$ and $s(k) = s \cdot k$
with t being the spacing between the signals determined by $s \cdot k$.

A value is then obtained for $Q_N$ as follows:

$$Q_N = \sqrt{\sum_{k=N_1}^{N_2} DQ_k} \tag{8}$$

Similarly, a value is obtained for $I_N$:

$$I_N = \sqrt{\sum_{k=N_1}^{N_2} DI_k} \tag{9}$$

The normalization factor relating the amplitude terms or the expressions for the quadrature and in-phase terms may then be calculated as:

$$R = \frac{Q_N}{I_N} \quad (10)$$

Usually only a small percentage of all samples of Q and I need be used. Using the parameters u(k) and s(k) as defined in example (d) above, differences are taken of squared terms t samples apart. Sums of these differences s samples apart are generated in estimating $Q_0/I_0$. Example (d), which is a special case of example (c) has been used in a simulation of the normalization method according to the present invention. Using u(k) and s(k) as defined in example (c), the general expressions of Equations (6) and (7) become:

$$DQ_k = |(Q_{u \cdot k + t})^2 - (Q_{s \cdot k})^2| \quad (11)$$

and $$DI_k = |(I_{u \cdot k + t})^2 - (I_{s \cdot k})^2|. \quad (12)$$

For example (d), Equations (11) and (12) become $$DQ_k = |(Q_{s \cdot k + t})^2 - (Q_{s \cdot k})^2| \quad (13)$$

and $$DI_k = |(I_{s \cdot k + t})^2 - (I_{s \cdot k})^2|, \quad (14)$$

Simulations of the normalization method have been performed with Math Cad with the index u=s where s is an integer. The model uses 32768 samples at a sample rate of 512,000/s. Polarization fading is incorporated into the model with drifts in the signal amplitude of about 15 percent over a run of 32768 samples lasting 64 ms. In the first trial, a small acoustic tone with an amplitude of 0.4 radians peak-to-peak at 500 Hz is introduced with no spinning phase due to static pressure or temperature variations. The algorithm outlined in for the special case of example (d) was used with s=100 and t=200 and was repeated 301 times to form the appropriate sums. In all, 303 samples containing 303 sine and 303 cosine terms were used out of the total of 32768 samples. This result was an estimate for $Q_0/I_0$ that was in error by only 0.5 percent.

In the second trial, a large acoustic tone of 100 radians peak-to-peak at 500 Hz was introduced. Integers s and t have the same values and only 53 samples were used. In this case the estimate for $Q_0/I_0$ was in error by only 0.16 percent. The simulations demonstrate the ability of the algorithm to estimate the normalization ratio to within a few tenths of one percent for small and large acoustic tones.

Additional simulations were done at the lower sampling rate of 50 thousand samples per second with a total run time of 655 milliseconds and a drift in signal amplitude of 15 percent due to polarization fading. Acoustic tones of only 0.6 radians peak-to-peak were introduced at a range of different frequencies from 1 kHz to 10 kHz. The worst case estimate for $Q_0/I_0$ was in error by 3 percent. In the vast majority of cases the error was less than 0.5 percent. Integer s is set to 10 and t is set to 3 and a total of 202 samples was used in all cases.

The same acoustic tones are introduced again in the presence of phase spinning at one Hz. With s set at 300 and t set at 150, a total of 202 samples was used. The worst case estimate for $Q_0/I_0$ was in error by only 1.5 percent when the tone amplitude was set to zero. These examples show that the algorithm parameters s, t, and $N_1$–$N_2$ can be varied to suit the operating conditions encountered.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A method for processing signals output from a pathlength mismatched interferometric sensor array that produces phase shifts in sensors included in the array to indicate changes in a parameter being monitored, comprising the steps of:

sampling the signal output from each sensor in the array to obtain for each sensor a first set of signal terms $Q_k = Q_0 B_k \sin \phi_k$ corresponding to the sine of the phase shift and a second set of signal terms $I_k = I_0 B_k \cos \phi_k$ corresponding to the cosine of the phase shift;

calculating a first quantity $DQ_k = |(Q_{u(k)})^2 - (Q_{s(k)})^2|$ and a second quantity $DI_k = |(I_{u(k)})^2 - (I_{s(k)})^2|$ where u(k) and s(k) are parameters used to determine indices that select specific sampled signals and k is a running index of the set of consecutive samples of Q and I;

$$\text{calculating a quantity } Q_N = \sqrt{\sum_{k=N_1}^{N_2} DQ_k} \ ;$$

$$\text{calculating a quantity } I_N = \sqrt{\sum_{k=N_1}^{N_2} DI_k} \ ; \text{ and}$$

calculating the ratio $R = Q_N/I_N$.

2. The method of claim 1 further including the step of modulating the phase of optical signals input to a selected one of the sensors in the array to normalize the signal terms $Q_N$ and $I_N$ so that the ratio $R = Q_N/I_N$ is unity for the selected sensor.

3. A system for processing signals output from a pathlength mismatched interferometric sensor array that produces phase shifts in sensors included in the array to indicate changes in a parameter being monitored, comprising:

means for sampling the signal output from each sensor in the array to obtain for each sensor a first set of signal terms $Q_k = Q_0 B_k \sin \phi_k$ corresponding to the sine of the phase shift and a second set of signal terms $I_k = I_0 B_k \cos \phi_k$ corresponding to the cosine of the phase shift;

means for calculating a first quantity $DQ_k = |(Q_{u(k)})^2 - (Q_{s(k)})^2|$ and a second quantity $DI_k = |(I_{u(k)})^2 - (I_{s(k)})^2|$ where u(k) and s(k) are parameters used to determine indices that select specific sampled signals and k is a running index of the set of consecutive samples of Q and I;

$$\text{means for calculating a quantity } Q_N = \sqrt{\sum_{k=N_1}^{N_2} DQ_k} \ ;$$

means for calculating a quantity $I_N = \sqrt{\sum_{k=N_1}^{N_2} DI_k}$ ; and means for calculating the ratio $R = Q_N/I_N$.

4. The system of claim 1 further including means for modulating the phase of optical signals input to a selected one of the sensors in the array to normalize the signal terms $Q_N$ and $I_N$ so that the ratio $R = Q_N/I_N$ is unity for the selected sensor.

* * * * *